United States Patent
Hu et al.

(10) Patent No.: US 11,423,907 B2
(45) Date of Patent: Aug. 23, 2022

(54) VIRTUAL OBJECT IMAGE DISPLAY METHOD AND APPARATUS, ELECTRONIC DEVICE AND STORAGE MEDIUM

(71) Applicant: Beijing Baidu Netcom Science and Technology Co., Ltd., Beijing (CN)

(72) Inventors: Tianshu Hu, Beijing (CN); Mingming Ma, Beijing (CN); Tonghui Li, Beijing (CN); Zhibin Hong, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 42 days.

(21) Appl. No.: 17/204,771

(22) Filed: Mar. 17, 2021

(65) Prior Publication Data

US 2021/0201912 A1 Jul. 1, 2021

(30) Foreign Application Priority Data

Sep. 14, 2020 (CN) .......................... 202010963639.5

(51) Int. Cl.
*G10L 15/25* (2013.01)
*G10L 15/06* (2013.01)
*G10L 15/08* (2006.01)

(52) U.S. Cl.
CPC ............ *G10L 15/25* (2013.01); *G10L 15/063* (2013.01); *G10L 15/083* (2013.01)

(58) Field of Classification Search
CPC ..... G10L 15/25; G10L 15/063; G10L 15/083; G10L 15/22

USPC .......................................................... 704/231
See application file for complete search history.

(56) References Cited

U.S. PATENT DOCUMENTS

| | | | | |
|---|---|---|---|---|
| 6,909,453 | B2 * | 6/2005 | Mochizuki | G10L 17/26 704/E21.02 |
| 7,362,899 | B2 * | 4/2008 | Rodyushkin | G06V 40/165 345/473 |
| 7,412,389 | B2 * | 8/2008 | Yang | G06T 13/80 345/473 |
| 9,524,081 | B2 * | 12/2016 | Keane | G06F 3/011 |
| 9,626,737 | B2 * | 4/2017 | Frushour | G06T 3/00 |
| 2021/0201886 | A1 * | 7/2021 | Li | G10L 21/10 |

* cited by examiner

*Primary Examiner* — Susan I McFadden
(74) *Attorney, Agent, or Firm* — Maginot, Moore & Beck LLP

(57) ABSTRACT

The application provides a virtual object image display method and apparatus, an electronic device and a storage medium, relates to the field of artificial intelligence, in particular to the field of computer vision and deep learning, and may be applied to virtual object dialogue scenarios. The specific implementation scheme includes: segmenting acquired voice to obtain voice segments; predicting lip shape sequence information for the voice segments; searching for a corresponding lip shape image sequence based on the lip shape sequence information; performing lip fusion between the lip shape image sequence and a virtual object baseplate to obtain a virtual object image; displaying the virtual object image. The application improves ability to obtain virtual object image.

15 Claims, 3 Drawing Sheets

VIRTUAL OBJECT IMAGE DISPLAY METHOD AND APPARATUS, ELECTRONIC DEVICE AND STORAGE MEDIUM

CROSS-REFERENCE TO RELATED APPLICATION

The present application claims a priority to the Chinese patent application No. 202010963639.5 filed in China on Sep. 14, 2020, a disclosure of which is incorporated herein by reference in its entirety.

TECHNICAL FIELD

The present disclosure relates to the field of artificial intelligence, in particular to the field of computer vision and deep learning.

BACKGROUND

Virtual objects may perform human-computer interaction. For example, a virtual object may answer a user's question and communicate with the user in real time. Therefore, the virtual objects are used in many industries such as finance, customers, entertainment and education. However, currently, a virtual object is mainly synthesized through the cloud; after synthesis, a synthesized virtual object image is transmitted to a terminal device through the network, and then is displayed on the terminal device.

SUMMARY

The present disclosure provides a virtual object image display method and apparatus, an electronic device and a storage medium.

According to an aspect of the present disclosure, a virtual object image display method is provided and includes segmenting acquired voice to obtain voice segments, and predicting lip shape sequence information for the voice segments. The method also includes searching for a corresponding lip shape image sequence based on the lip shape sequence information, and performing lip fusion between the lip shape image sequence and a virtual object baseplate to obtain a virtual object image. The method also includes displaying the virtual object image.

According to another aspect of the present disclosure, a virtual object image display apparatus is provided and includes a segmentation module, a prediction module, a searching module, a fusion module, and a display module. The segmentation module is configured to segment acquired voice to obtain voice segments. The prediction module is configured to predict lip shape sequence information for the voice segments. The searching module is configured to search for a corresponding lip shape image sequence based on the lip shape sequence information. The fusion module is configured to perform lip fusion between the lip shape image sequence and a virtual object baseplate to obtain a virtual object image. The display module is configured to display the virtual object image.

According to another aspect of the present disclosure, an electronic device is provided and includes, at least one processor and a memory communicatively connected to the at least one processor. The memory stores instructions executable by the at least one processor to enable the at least one processor to implement the virtual object image display method provided in the present disclosure.

According to another aspect of the present disclosure, a non-transitory computer-readable storage medium storing computer instructions is provided. The computer instructions are used for causing the computer to perform the virtual object image display method provided in the present disclosure.

According to the technical solution of the embodiment of the application, the virtual object image can be obtained locally and displayed. In this way, since there is no need to obtain virtual object images through the network, the problem of unable to obtain virtual object images due to the network environment can be avoided, thereby improving the ability to obtain virtual object images.

It is to be understood that the contents in this section are not intended to identify the key or critical features of the embodiments of the present application, and are not intended to limit the scope of the present application. Other features of the present application will become readily apparent from the following description.

BRIEF DESCRIPTION OF THE DRAWINGS

The drawings are included to provide a better understanding of the present disclosure and are not to be construed as limiting the present disclosure. Wherein.

DETAILED DESCRIPTION

Reference will now be made in detail to the exemplary embodiments of the present application, examples of which are illustrated in the accompanying drawings, wherein the various details of the embodiments of the present application are included to facilitate understanding and are to be considered as exemplary only. Accordingly, a person skilled in the art should appreciate that various changes and modifications can be made to the embodiments described herein without departing from the scope and spirit of the present application. Also, descriptions of well-known functions and structures are omitted from the following description for clarity and conciseness.

Figure 1:
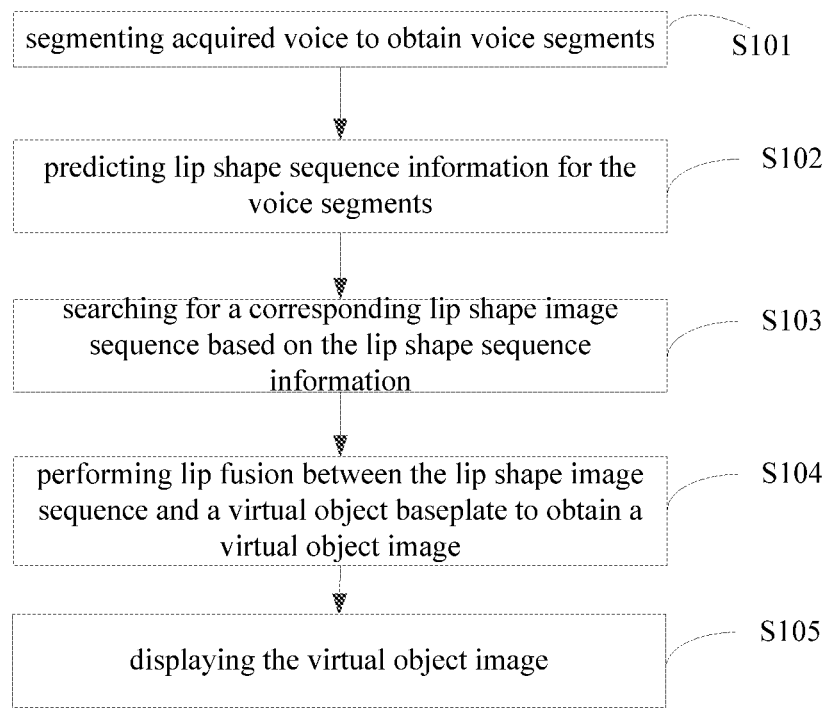
FIG. 1 is a flowchart of an exemplary virtual object image display method provided in the present disclosure.

Referring to FIG. 1, FIG. 1 is a flowchart of a virtual object image display method provided in the present disclosure. As shown in FIG. 1, the method includes the following steps.

Step S101: segmenting acquired voice to obtain voice segments.

The foregoing acquired voice may be a voice to be played by a virtual object, such as the virtual object's response voice to a voice provided by the user, or a voice actively played by the virtual object.

In the present disclosure, the virtual object may be a virtual person, which is not limited to this. For example, the virtual object may also be a virtual animal or other virtual objects that support language playback.

In addition, the foregoing voice may also be a segment of voice that is passed in each time, for example, a sentence or a paragraph.

Further, the foregoing acquisition may be obtained locally, for example: a local response voice predicted for a voice provided by a user, which is not limited to this, for example, a voice sent by other device.

The foregoing segmenting acquired voice to obtain voice segments, may include: segmenting the acquired voice according to a fixed length to obtain multiple fixed-length voice segments.

Step S102: predicting lip shape sequence information for the voice segments.

The foregoing predicting lip shape sequence information for the voice segments, may include: sequentially predicting the lip shape sequence information for multiple voice segments.

The foregoing lip shape sequence information may include a lip shape key point sequence or a lip shape index sequence, i.e., including key points of multiple lip shapes or an index of multiple lip shapes.

Further, the foregoing prediction may be directly performed by using the voice segment. In this way, since there is no need to extract voice features (such as mfcc feature) of the voice segment, an efficiency of the prediction can be improved. For example, when the foregoing voice segment is a way format voice, this step may include: predicting lip shape sequence information by directly using the way voice segment. Of course, this is not limited in the present disclosure. For example, for some segments, mfcc features may be extracted and the mfcc features may be used to predict lip shape sequence information.

Step S103: searching for a corresponding lip shape image sequence based on the lip shape sequence information.

The forgoing searching for a corresponding lip shape image sequence based on the lip shape sequence information, may include: searching for the lip shape image sequence corresponding to the lip shape sequence information in a lip shape image database. In this way, since the corresponding lip shape image sequence is directly searched, a calculation amount can be reduced and an efficiency of obtaining the lip shape image sequence can be improved.

Step S104: performing lip fusion between the lip shape image sequence and a virtual object baseplate to obtain a virtual object image.

The foregoing virtual object baseplate may be pre-configured. The foregoing performing lip fusion between the lip shape image sequence and a virtual object baseplate to obtain a virtual object image, may include: sequentially fusing lip images in the lip shape image sequence with lips of the virtual object baseplate, thereby obtaining multiple continuous virtual object images, i.e., a virtual object image video.

Step S105: displaying the virtual object image.

In the present disclosure, when displaying the virtual object image, the foregoing acquired voice may also be played, thereby realizing synchronization of the image and voice of the virtual object.

In the present disclosure, the voice segments may be processed independently. For example, after obtaining a virtual object image corresponding to one voice segment, lip shape sequence information for another voice segment is predicted to obtain a virtual object image for the another voice segment; or, after lip shape sequence information for one voice segment is predicted, lip shape sequence information for a next voice segment is predicted when the lip shape sequence information for the one voice segment is processed.

In the present disclosure, through the above steps, the virtual object image corresponding to the voice can be generated locally and displayed. In this way, since there is no need to obtain virtual object images through the network, the problem of unable to obtain virtual object images due to the network environment can be avoided, thereby improving the ability to obtain virtual object images to get rid of dependence of virtual object-related products on network signals. Further, since the voice is segmented into voice segments, this can avoid the problem of inability to process the entire voice at one time due to limited computing resources of the electronic device, thereby further improving the ability of the electronic device to obtain virtual object images. In addition, since the processing is performed on the voice segment, this can avoid the problem of unable to display the corresponding virtual object image in time due to the acquired voice being too long, thereby achieving the effect of timely displaying the virtual object image.

It should be noted that the present disclosure may be applied to an electronic device, such as a mobile terminal, a computer, a smart watch, a television, and other electronic devices with display functions.

As an optional embodiment, the predicting lip shape sequence information for the voice segments, includes:

inputting the voice segments into a prediction model for prediction to obtain the lip shape sequence information for the voice segments, where the prediction model is an end-to-end model in which an input is voice segments and an output is lip shape sequence information.

The foregoing prediction model may be pre-trained. For example, the model is trained by using a voice segment as a training sample, to obtain an end-to-end model in which an input is voice segments and an output is lip shape sequence information. Of course, the foregoing prediction model may also be configured by other devices in advance.

In this embodiment, since the voice segment is directly input into the prediction model for prediction, there is no need to perform operations of extracting voice data features, which can improve operation efficiency. For example, a way voice segment may be directly input into the prediction model for prediction, to obtain the lip shape sequence information.

It should be noted that the present disclosure does not limit the prediction performed by the foregoing prediction model. For example, in some scenarios, voice data features may also be extracted for prediction. For example, for some high-performance electronic devices, voice data features may be extracted for prediction.

As an optional embodiment, the segmenting acquired voice to obtain voice segments, includes:

segmenting the acquired voice to obtain multiple voice segments, where there is a partial overlap between adjacent voice segments.

The predicting lip shape sequence information for the voice segments, includes:

sequentially predicting lip shape sequence information for the multiple voice segments.

A length of the foregoing partial overlap may be pre-configured, which may be flexibly set according to application scenarios or business requirements.

In this embodiment, due to the partial overlap between adjacent voice segments, it can be realized that each voice segment retains contextual information between the voice segments, thereby improving the accuracy of prediction of the lip shape sequence information.

In addition, since the lip shape sequence information for the multiple voice segments is predicted sequentially, the virtual object image corresponding to each voice segment can be obtained in time, thereby avoiding the problem of unable to obtain the virtual object image in time due to the acquired speech being excessively long. For example, end-to-end processing is performed on each voice segment, that is, after a virtual object image of one voice segment is obtained, a next voice segment is processed to obtain a virtual object image corresponding to the voice segment.

Optionally, the searching for a corresponding lip shape image sequence based on the lip shape sequence information, includes:

removing lip shape information of an overlapping voice from lip shape sequence information of a first voice segment to obtain updated lip shape sequence information, and searching for a corresponding lip shape image sequence based on the updated lip shape sequence information;

where the overlapping voice is an overlapping voice between the first voice segment and a second voice segment, and the first voice segment and the second voice segment are any two adjacent voice segments in the multiple voice segments.

The foregoing second voice segment may be a previous voice segment of the first voice segment, so that lip shape information corresponding to an overlapping voice between each voice segment and its previous voice segment can be removed from each voice segment, thereby ensuring that a final displayed virtual object image will not have a problem of overlapping, and improving display effects of the virtual object image. Of course, the foregoing second voice segment may also be a subsequent voice segment of the first voice segment, and the same effect can be achieved.

It should be noted that the present disclosure is not limited to removing the lip shape information of the overlapping voice. For example, it is also possible to remove an overlapping lip shape image instead of the overlapping lip shape information, and the same effect can be achieved.

As an optional embodiment, the performing lip fusion between the lip shape image sequence and a virtual object baseplate, includes:

dividing the lip shape image sequence into M lip shape images, where M is an integer greater than 1;

using M cores included in a processor to perform lip fusion on the M lip shape images with the virtual object base plate in parallel.

The foregoing M may be the maximum number of CPU cores of the electronic device.

For example, the foregoing lip shape image sequence includes N lip shape images, the N lip shape images are divided into M parts, and then the first, . . . , M-th lip shape picture are simultaneously transmitted to the first, . . . , M-th core of the device for processing; after processing, the first M frames are directly output; then, (M+1)-th, . . . , (2*M)-th lip shape image are simultaneously transmitted to the first, . . . , M-th core of the device for processing, and so on.

In this embodiment, through the foregoing parallel processing, the efficiency of fusing images can be improved. For example, the time required to fuse N lip shape images can be reduced by N/M times.

As an optional embodiment, the segmenting acquired voice to obtain voice segments, includes:

in case that a current network environment is a preset network environment, segmenting the acquired voice to obtain the voice segments.

The method further includes:

in case that the current network environment is not the preset network environment, transmitting the acquired voice to the cloud, receiving virtual object images corresponding to the voice returned by the cloud, and displaying the virtual object images corresponding to the voice.

The foregoing preset network environment may be a network disconnection environment, a slow network environment or an environment with limited processing process of the electronic device.

In this embodiment, modes of acquiring virtual object images can be flexibly selected according to the current network environment, thereby improving the processing capabilities of the electronic device.

According to the technical solution of the present disclosure, the virtual object image can be obtained locally and displayed. In this way, since there is no need to obtain virtual object images through the network, the problem of unable to obtain virtual object images due to the network environment can be avoided, thereby improving the ability to obtain virtual object images.

Figure 2:
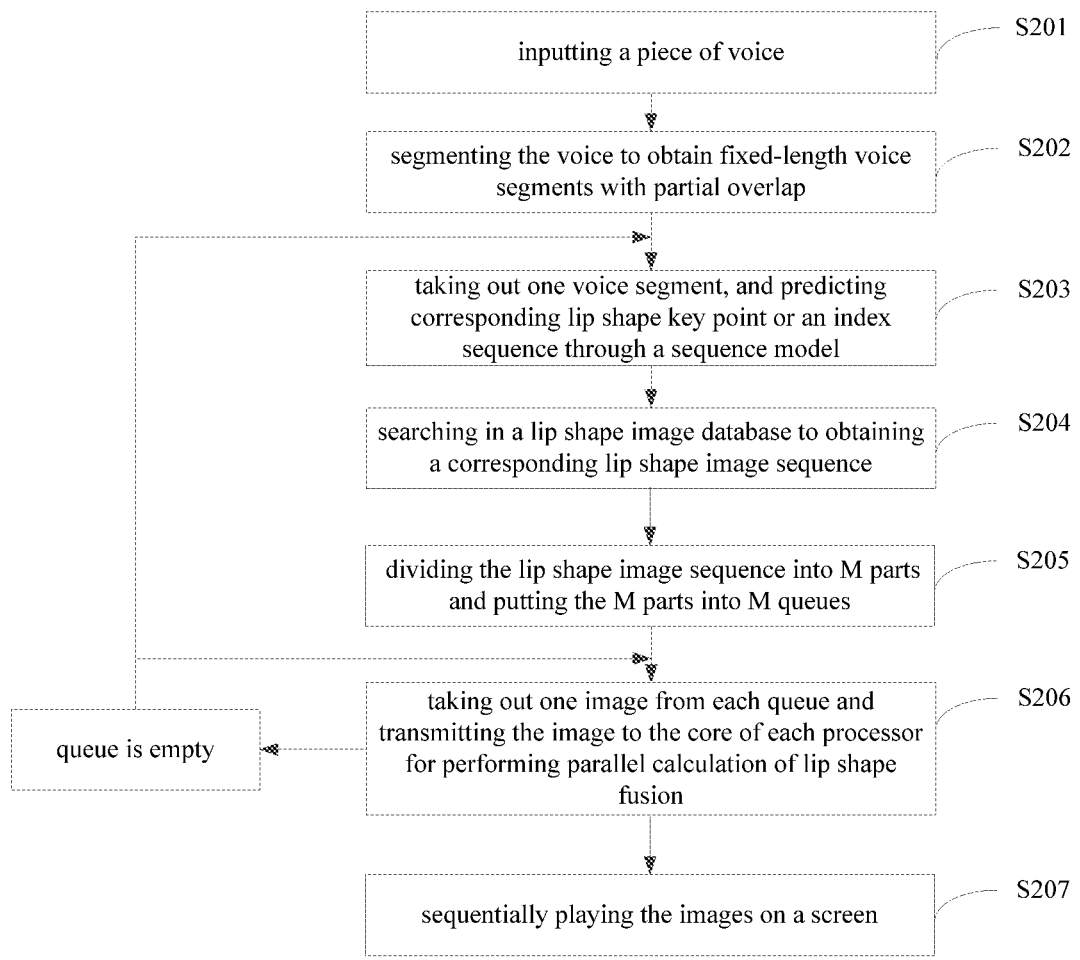
FIG. 2 is a flowchart of another exemplary virtual object image display method provided in the present disclosure.

Referring to FIG. 2, FIG. 2 is a flowchart of another virtual object image display method provided in the present disclosure. As shown in FIG. 2, the method includes the following steps.

Step S201: inputting a piece of voice;

Step S202: segmenting the voice to obtain fixed-length voice segments with partial overlap;

Step S203: taking out one voice segment, and predicting corresponding lip shape key point or an index sequence through a sequence model;

Step S204: searching in a lip shape image database to obtaining a corresponding lip shape image sequence;

Step S205: dividing the lip shape image sequence into M parts and putting the M parts into M queues, where M is the number of processor cores of an electronic device;

Step S206: taking out one image from each queue and transmitting the image to the core of each processor for performing parallel calculation of lip shape fusion; in case that each queue is empty, returning to the step S203 to process another voice segment;

Step S207: sequentially playing the images on a screen.

Figure 3:
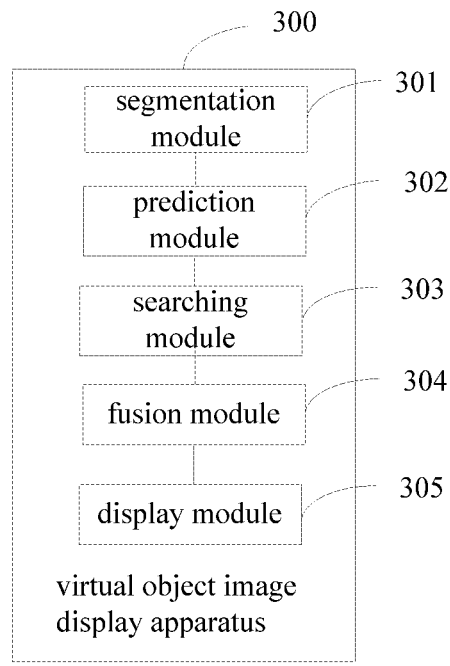
FIG. 3 is a structural diagram of an exemplary virtual object image display apparatus provided in the present disclosure.

Referring to FIG. 3, FIG. 3 is a structural diagram of a virtual object image display apparatus provided in the present disclosure. As shown in FIG. 3, the virtual object image display apparatus 300 includes:

a segmentation module 301 used to segment acquired voice to obtain voice segments;

a prediction module 302 used to predict lip shape sequence information for the voice segments;

a searching module 303 used to search for a corresponding lip shape image sequence based on the lip shape sequence information;

a fusion module 304 used to perform lip fusion between the lip shape image sequence and a virtual object baseplate to obtain a virtual object image;

a display module 305 used to display the virtual object image.

Optionally, the prediction module 302 is used to input the voice segments into a prediction model for prediction to obtain the lip shape sequence information for the voice segments, where the prediction model is an end-to-end model in which an input is voice segments and an output is lip shape sequence information.

Optionally, the segmentation module 301 is used to segment the acquired voice to obtain multiple voice segments, where there is a partial overlap between adjacent voice segments.

The prediction module 302 is used to sequentially predict lip shape sequence information for the multiple voice segments.

Optionally, the search module 303 is used to remove lip shape information of an overlapping voice from lip shape sequence information of a first voice segment to obtain updated lip shape sequence information, and search for a corresponding lip shape image sequence based on the updated lip shape sequence information;

where the overlapping voice is an overlapping voice between the first voice segment and the second voice segment, and the first voice segment and the second voice segment are any two adjacent voice segments in the multiple voice segments.

Optionally, the fusion module 304 is used to divide the lip shape image sequence into M lip shape images, where M is an integer greater than 1; use M cores included in a processor to perform lip fusion on the M lip shape images with the virtual object base plate in parallel.

The apparatus provided in this embodiment can implement each process implemented in the method embodiment shown in FIG. 1 and can achieve the same beneficial effects. To avoid repetition, details are not described herein again.

According to the embodiments of the present disclosure, the present disclosure further provides an electronic device and a non-transitory computer-readable storage medium storing computer instructions.

Figure 4:
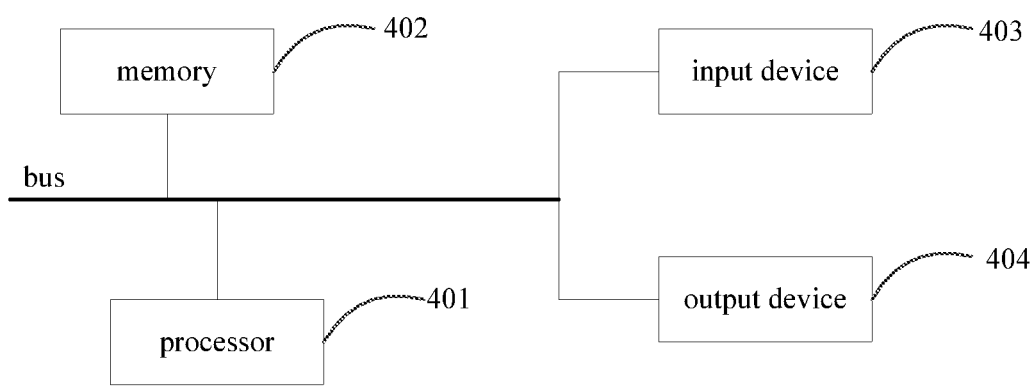
FIG. 4 is a block diagram of an exemplary electronic device for implementing a virtual object image display method according to an embodiment of the present disclosure.

FIG. 4 is a block diagram of an electronic device of a virtual object image display method according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processing, cellular telephones, smart phones, wearable devices, and other similar computing devices. The components shown herein, their connections and relationships, and their functions are by way of example only and are not intended to limit the implementations of the present application described and/or claimed herein.

As shown in FIG. 4, the electronic device includes: one or more processors 401, a memory 402, and interfaces for connecting various components, including high-speed interfaces and low-speed interfaces. The various components are interconnected using different buses and may be mounted on a common motherboard or otherwise as desired. The processor may process instructions for execution within the electronic device, including instructions stored in the memory or on the memory to display graphical information of a Graphical User Interface (GUI) on an external input/output device, such as a display device coupled to the interface. In other embodiments, multiple processors and/or multiple buses and multiple memories may be used with multiple memories if desired. Similarly, multiple electronic devices may be connected, each providing part of the necessary operations (e.g., as an array of servers, a set of blade servers, or a multiprocessor system). In FIG. 4, one processor 401 is taken as an example.

The memory 402 is a non-transitory computer-readable storage medium provided herein. The memory stores instructions executable by at least one processor to enable the at least one processor to implement the virtual object image display method provided herein. The non-transitory computer-readable storage medium of the present application stores computer instructions for enabling a computer to implement the virtual object image display method provided herein.

The memory 402, as a non-transitory computer-readable storage medium, may be used to store non-transitory software programs, non-transitory computer-executable programs, and modules, such as program instructions/modules (e.g., the segmentation module 301, the prediction module 302, the searching module 303, the fusion module 304 and the display module 305 shown in FIG. 3) corresponding to the virtual object image display method of embodiments of the present application. The processor 401 executes various functional applications of the server and data processing, i.e., a virtual object image display method in the above-mentioned method embodiment, by operating non-transitory software programs, instructions, and modules stored in the memory 402.

The memory 402 may include a program storage area and a data storage area, wherein the program storage area may store an application program required by an operating system and at least one function; the data storage area may store data created according to the use of the electronic device of the virtual object image display method, etc. In addition, the memory 402 may include a high speed random access memory, and may also include a non-transitory memory, such as at least one magnetic disk storage device, a flash memory device, or other non-transitory solid state memory device. In some embodiments, the memory 402 may optionally include memories remotely located with respect to processor 401, which may be connected via a network to the electronic device of the virtual object image display method. Examples of such networks include, but are not limited to, the Internet, intranet, local area networks, mobile communication networks, and combinations thereof.

The electronic device of the virtual object image display method may further include: an input device 403 and an output device 404. The processor 401, the memory 402, the input device 403, and the output device 404 may be connected via a bus or otherwise. FIG. 4 takes a bus connection as an example.

The input device 403 may receive input numeric or character information and generate key signal inputs related to user settings and functional controls of the electronic device of the virtual object image display method, such as input devices including touch screens, keypads, mice, track pads, touch pads, pointing sticks, one or more mouse buttons, trackballs, joysticks, etc. The output device 404 may include display devices, auxiliary lighting devices (e.g., LEDs), tactile feedback devices (e.g., vibration motors), and the like. The display device may include, but is not limited to, a Liquid Crystal Display (LCD), a Light Emitting Diode (LED) display, and a plasma display. In some embodiments, the display device may be a touch screen.

Various embodiments of the systems and techniques described herein may be implemented in digital electronic circuit systems, integrated circuit systems, Application Specific Integrated Circuits (ASICs), computer hardware, firmware, software, and/or combinations thereof. These various embodiments may include: implementation in one or more computer programs which can be executed and/or interpreted on a programmable system including at least one programmable processor, and the programmable processor may be a dedicated or general-purpose programmable processor which can receive data and instructions from, and transmit data and instructions to, a memory system, at least one input device, and at least one output device.

These computing programs (also referred to as programs, software, software applications, or codes) include machine instructions of a programmable processor, and may be implemented using high-level procedural and/or object-oriented programming languages, and/or assembly/machine languages. As used herein, the terms "machine-readable medium" and "computer-readable medium" refer to any computer program product, device, and/or apparatus (e.g., magnetic disk, optical disk, memory, programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide for interaction with a user, the systems and techniques described herein may be implemented on a computer having: a display device (e.g., a Cathode Ray Tube (CRT) or Liquid Crystal Display (LCD) monitor) for displaying information to a user; and a keyboard and a pointing device (e.g., a mouse or a trackball) by which a user can provide input to the computer. Other types of devices may also be used to provide interaction with a user; for example, the feedback provided to the user may be any form of sensory feedback (e.g., visual feedback, audile feedback, or tactile feedback); and input from the user may be received in any form, including acoustic input, audio input, or tactile input.

The systems and techniques described herein may be implemented in a computing system that includes a background component (e.g., as a data server), or a computing system that includes a middleware component (e.g., an application server), or a computing system that includes a front-end component (e.g., a user computer having a graphical user interface or a web browser through which a user may interact with embodiments of the systems and techniques described herein), or in a computing system that includes any combination of such background component, middleware component, or front-end component. The components of the system may be interconnected by digital data communication (e.g., a communication network) of any form or medium. Examples of the communication network include: Local Area Networks (LANs), Wide Area Networks (WANs), and the Internet.

The computer system may include a client and a server. The client and the server are typically remote from each other and typically interact through a communication network. A relationship between the client and the server is generated by computer programs operating on respective computers and having a client-server relationship with each other.

According to the technical solution of the embodiment of the application, the virtual object image can be obtained locally and displayed. In this way, since there is no need to obtain virtual object images through the network, the problem of unable to obtain virtual object images due to the network environment can be avoided, thereby improving the ability to obtain virtual object images.

It will be appreciated that the various forms of flow, reordering, adding or removing steps shown above may be used. For example, the steps recited in the present application may be performed in parallel or sequentially or may be performed in a different order, so long as the desired results of the technical solutions disclosed in the present application can be achieved, and no limitation is made herein.

The above-mentioned embodiments are not to be construed as limiting the scope of the present application. It will be apparent to a person skilled in the art that various modifications, combinations, sub-combinations and substitutions are possible, depending on design requirements and other factors. Any modifications, equivalents, and improvements within the spirit and principles of this application are intended to be included within the scope of the present application.

What is claimed is:

1. A virtual object image display method, comprising:
segmenting acquired voice to obtain voice segments;
predicting lip shape sequence information for the voice segments;
searching for a corresponding lip shape image sequence based on the lip shape sequence information;
performing lip fusion between the lip shape image sequence and a virtual object baseplate to obtain a virtual object image; and
displaying the virtual object image.

2. The method according to claim 1, wherein predicting the lip shape sequence information for the voice segments comprises:
inputting the voice segments into a prediction model for prediction to obtain the lip shape sequence information for the voice segments, wherein the prediction model is an end-to-end model in which an input is voice segments and an output is lip shape sequence information.

3. The method according to claim 1, wherein:
segmenting the acquired voice to obtain voice segments comprises segmenting the acquired voice to obtain a plurality of voice segments, wherein there is a partial overlap between adjacent voice segments; and
predicting the lip shape sequence information for the voice segments comprises sequentially predicting lip shape sequence information for the multiple voice segments.

4. The method according to claim 3, wherein:
searching for the corresponding lip shape image sequence based on the lip shape sequence information comprises removing lip shape information of an overlapping voice from lip shape sequence information of a first voice segment to obtain updated lip shape sequence information, and searching for a corresponding lip shape image sequence based on the updated lip shape sequence information;
the overlapping voice is an overlapping voice between the first voice segment and a second voice segment; and
the first voice segment and the second voice segment are any two adjacent voice segments in the voice segments.

5. The method according to claim 1, wherein performing the lip fusion between the lip shape image sequence and a virtual object baseplate comprises:
dividing the lip shape image sequence into M lip shape images, wherein M is an integer greater than 1; and
using M cores included in a processor to perform lip fusion on the M lip shape images with the virtual object base plate in parallel.

6. An electronic device, comprising:
at least one processor; and
a memory communicatively connected to the at least one processor; wherein,
the memory stores instructions executable by the at least one processor to enable the at least one processor to:
segment acquired voice to obtain voice segments;
predict lip shape sequence information for the voice segments;

search for a corresponding lip shape image sequence based on the lip shape sequence information;
perform lip fusion between the lip shape image sequence and a virtual object baseplate to obtain a virtual object image; and
display the virtual object image.

7. The electronic device according to claim 6, wherein the at least one processor is further configured to:
input the voice segments into a prediction model for prediction to obtain the lip shape sequence information for the voice segments, wherein the prediction model is an end-to-end model in which an input is voice segments and an output is lip shape sequence information.

8. The electronic device according to claim 6, wherein the at least one processor is further configured to:
segment the acquired voice to obtain a plurality of voice segments, wherein there is a partial overlap between adjacent voice segments;
sequentially predict lip shape sequence information for the multiple voice segments.

9. The electronic device according to claim 8, wherein the at least one processor is further configured to:
remove lip shape information of an overlapping voice from lip shape sequence information of a first voice segment to obtain updated lip shape sequence information, and search for a corresponding lip shape image sequence based on the updated lip shape sequence information;
wherein the overlapping voice is an overlapping voice between the first voice segment and a second voice segment, and the first voice segment and the second voice segment are any two adjacent voice segments in the voice segments.

10. The electronic device according to claim 6, wherein the at least one processor is further configured to:
divide the lip shape image sequence into M lip shape images, wherein M is an integer greater than 1; and
use M cores included in a processor to perform lip fusion on the M lip shape images with the virtual object base plate in parallel.

11. A non-transitory computer-readable storage medium storing computer instructions for causing the computer to:
segment acquired voice to obtain voice segments;
predict lip shape sequence information for the voice segments;
search for a corresponding lip shape image sequence based on the lip shape sequence information;
perform lip fusion between the lip shape image sequence and a virtual object baseplate to obtain a virtual object image; and
display the virtual object image.

12. The non-transitory computer-readable storage medium according to claim 11, wherein the computer instructions are further configured to cause the computer to:
input the voice segments into a prediction model for prediction to obtain the lip shape sequence information for the voice segments, wherein the prediction model is an end-to-end model in which an input is voice segments and an output is lip shape sequence information.

13. The non-transitory computer-readable storage medium according to claim 11, wherein the computer instructions are further configured to cause the computer to:
segment the acquired voice to obtain a plurality of voice segments, wherein there is a partial overlap between adjacent voice segments; and
sequentially predict lip shape sequence information for the multiple voice segments.

14. The non-transitory computer-readable storage medium according to claim 13, wherein the computer instructions are further configured to cause the computer to:
remove lip shape information of an overlapping voice from lip shape sequence information of a first voice segment to obtain updated lip shape sequence information, and search for a corresponding lip shape image sequence based on the updated lip shape sequence information; and
wherein the overlapping voice is an overlapping voice between the first voice segment and a second voice segment, and the first voice segment and the second voice segment are any two adjacent voice segments in the voice segments.

15. The non-transitory computer-readable storage medium according to claim 11, wherein the computer instructions are further configured to cause the computer to:
divide the lip shape image sequence into M lip shape images, wherein M is an integer greater than 1; and
use M cores included in a processor to perform lip fusion on the M lip shape images with the virtual object base plate in parallel.

\* \* \* \* \*